United States Patent
Narita et al.

(10) Patent No.: US 8,104,563 B2
(45) Date of Patent: Jan. 31, 2012

(54) HOOD AIRBAG DEVICE FOR USE IN A VEHICLE

(75) Inventors: Sotaro Narita, Toyota (JP); Hiroyuki Takahashi, Aichi-ken (JP); Takayuki Takimoto, Tokyo (JP)

(73) Assignees: Toyota Jidosha Kabushiki Kaisha, Toyota-shi, Aichi-ken (JP); Takata Corporation, Tokyo (JP)

( * ) Notice: Subject to any disclaimer, the term of this patent is extended or adjusted under 35 U.S.C. 154(b) by 312 days.

(21) Appl. No.: 12/223,167

(22) PCT Filed: Jan. 4, 2007

(86) PCT No.: PCT/IB2007/000009
§ 371 (c)(1),
(2), (4) Date: Jul. 24, 2008

(87) PCT Pub. No.: WO2007/085917
PCT Pub. Date: Aug. 2, 2007

(65) Prior Publication Data
US 2010/0230944 A1      Sep. 16, 2010

(30) Foreign Application Priority Data
Jan. 25, 2006   (JP) .................. 2006-016507

(51) Int. Cl.
*B60R 21/34* (2006.01)
(52) U.S. Cl. ........................................ 180/274
(58) Field of Classification Search .................. 180/274; B60R 21/34
See application file for complete search history.

(56) References Cited

U.S. PATENT DOCUMENTS

| | | | |
|---|---|---|---|
| 6,827,170 B2 | 12/2004 | Hamada et al. | |
| 6,923,286 B2 * | 8/2005 | Sato et al. | 180/274 |
| 7,025,164 B2 * | 4/2006 | Takimoto | 180/274 |
| 7,341,274 B2 * | 3/2008 | Mori et al. | 280/728.2 |
| 7,390,014 B2 * | 6/2008 | Takimoto | 280/730.1 |
| 7,549,663 B2 * | 6/2009 | Takimoto et al. | 280/274 |
| 7,712,767 B2 * | 5/2010 | Takahashi et al. | 280/728.3 |
| 7,726,433 B2 * | 6/2010 | Satou et al. | 180/274 |

(Continued)

FOREIGN PATENT DOCUMENTS

JP        7-156749      6/1995

(Continued)

OTHER PUBLICATIONS

International Search Report, Oct. 28, 2010.

(Continued)

*Primary Examiner* — Paul N Dickson
*Assistant Examiner* — Nicole Verley
(74) *Attorney, Agent, or Firm* — Finnegan, Henderson, Farabow, Garrett & Dunner, LLP

(57) ABSTRACT

In a hood airbag device for use in a vehicle, left and right bag-expansion openings are formed at the rear end portion of the outer hood panel in a hood width direction, and the deployment positions of corresponding left and right airbags are controlled or restrained by the bag-expansion openings, respectively. Further, the hood-center side ends (60L') of the left air bag (60L) and the hood-center side ends (60R') of the right air bag (60R) are adapted to press against each other when they are deployed. Accordingly, it is possible to suppress the airbags from being raised up by a wind pressure or the like and to quickly deploy the airbags over a broad extent.

13 Claims, 12 Drawing Sheets

U.S. PATENT DOCUMENTS

| | | | |
|---|---|---|---|
| 2004/0011581 A1* | 1/2004 | Takimoto | 180/274 |
| 2009/0001691 A1* | 1/2009 | Takimoto et al. | 280/728.1 |

FOREIGN PATENT DOCUMENTS

| | | |
|---|---|---|
| JP | 7-232615 | 9/1995 |
| JP | 7-246908 | 9/1995 |
| JP | 9-164906 | 6/1997 |
| JP | 3105391 | 9/2000 |
| JP | 2003-104144 | 4/2003 |
| JP | 2003-191818 | 7/2003 |
| JP | 2003-291756 | 10/2003 |
| JP | 2003-327064 | 11/2003 |
| JP | 2005-262954 | 9/2005 |
| JP | 2005-271645 | 10/2005 |
| JP | 2005-280553 | 10/2005 |
| JP | 2005-349954 | 12/2005 |
| JP | 2008143301 A * | 6/2008 |
| JP | 2009190606 A * | 8/2009 |

OTHER PUBLICATIONS

Written Opinion of the ISR, Oct. 28, 2010.
Notification of Reason(s) for Refusal for JP Appl. No. 2008-282979 dated Nov. 2, 2010.

* cited by examiner

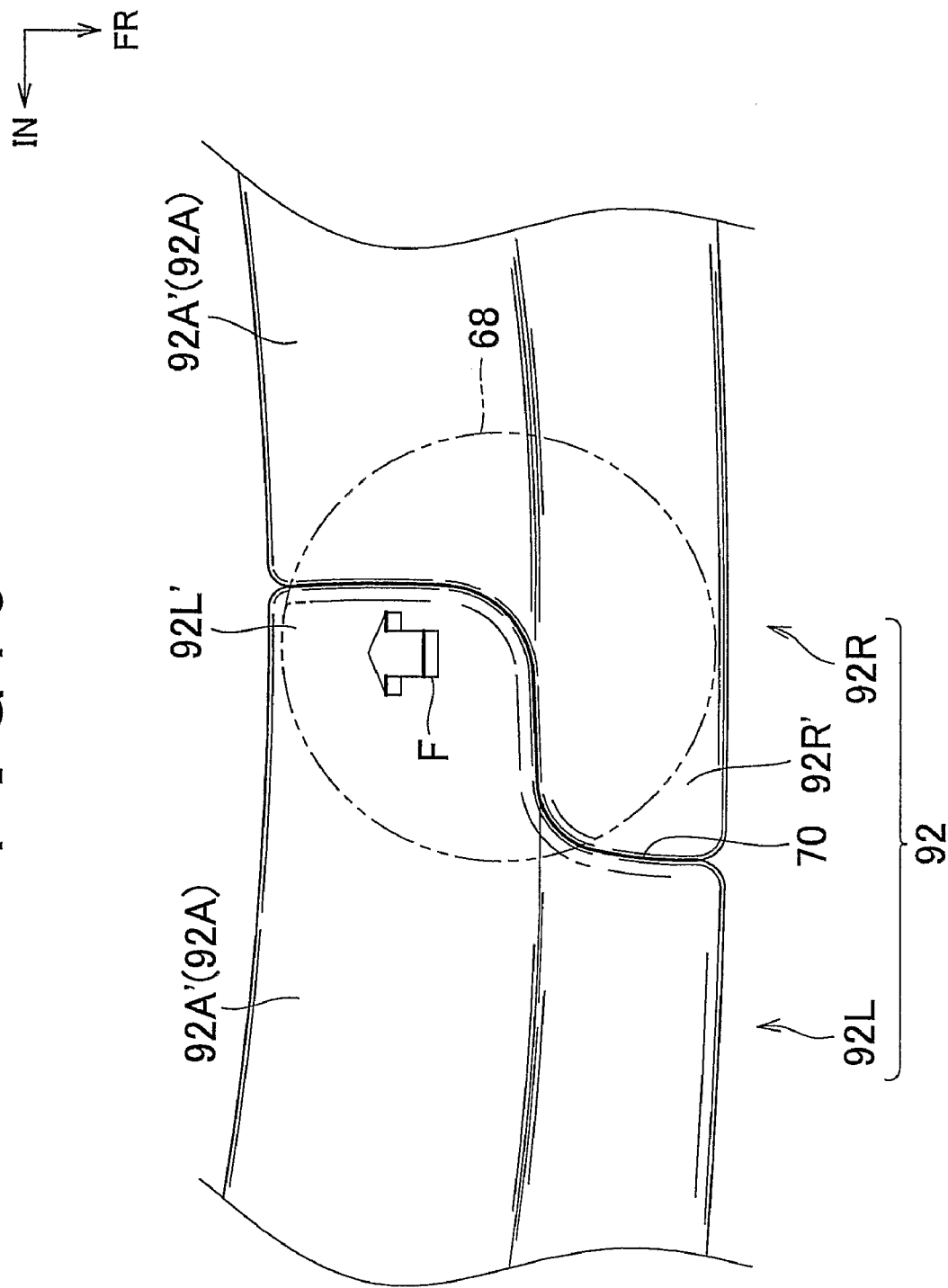

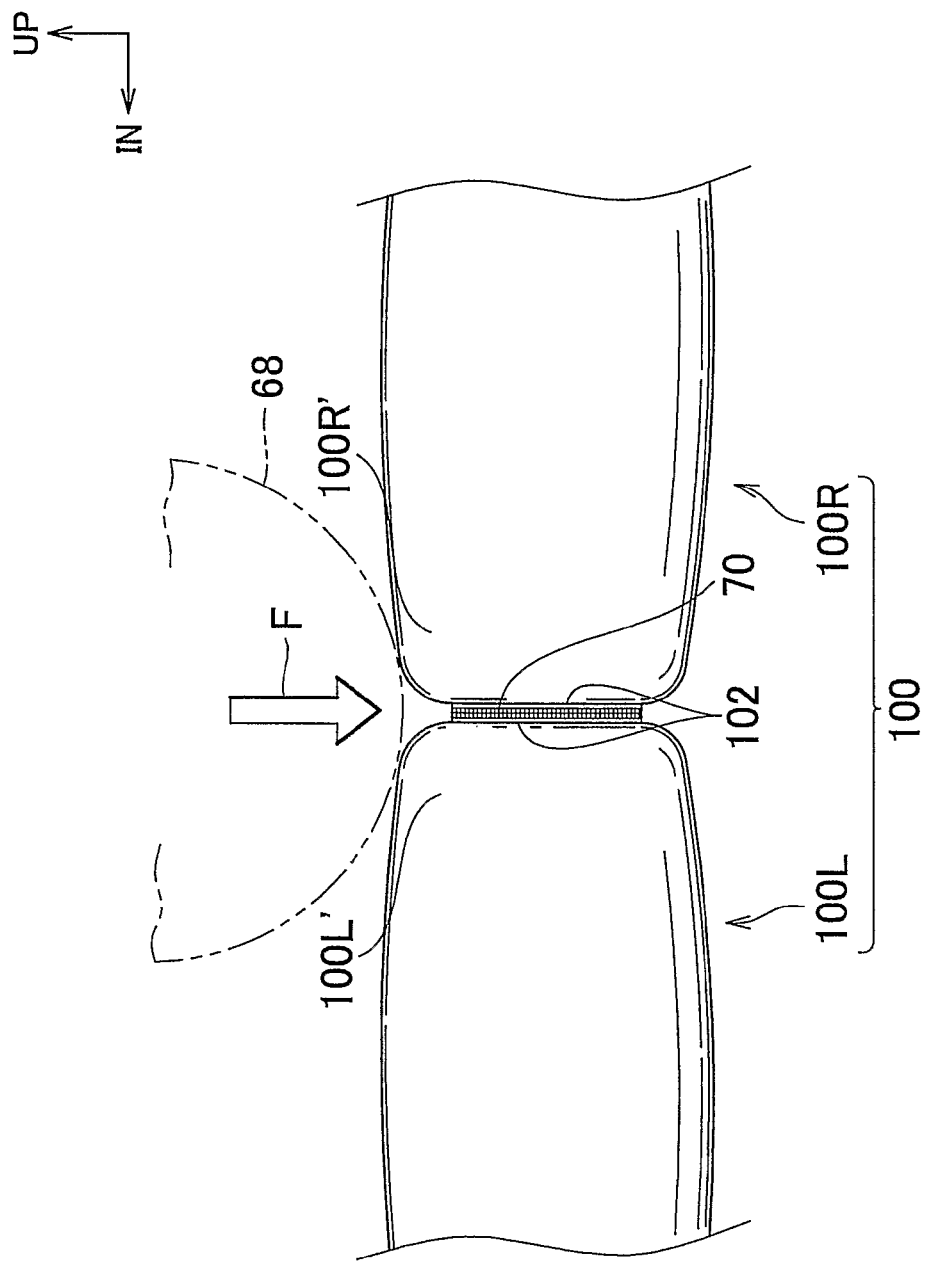

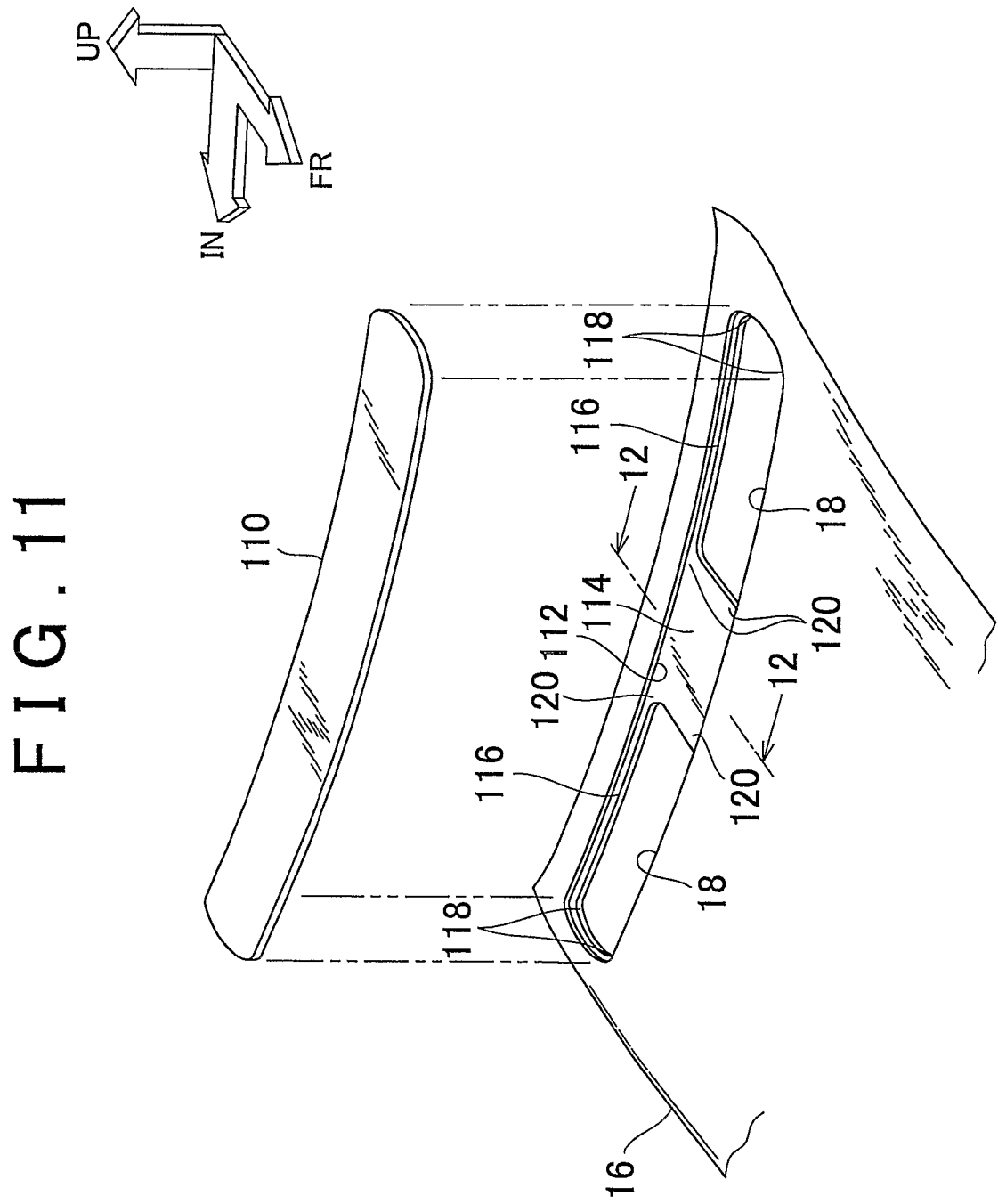

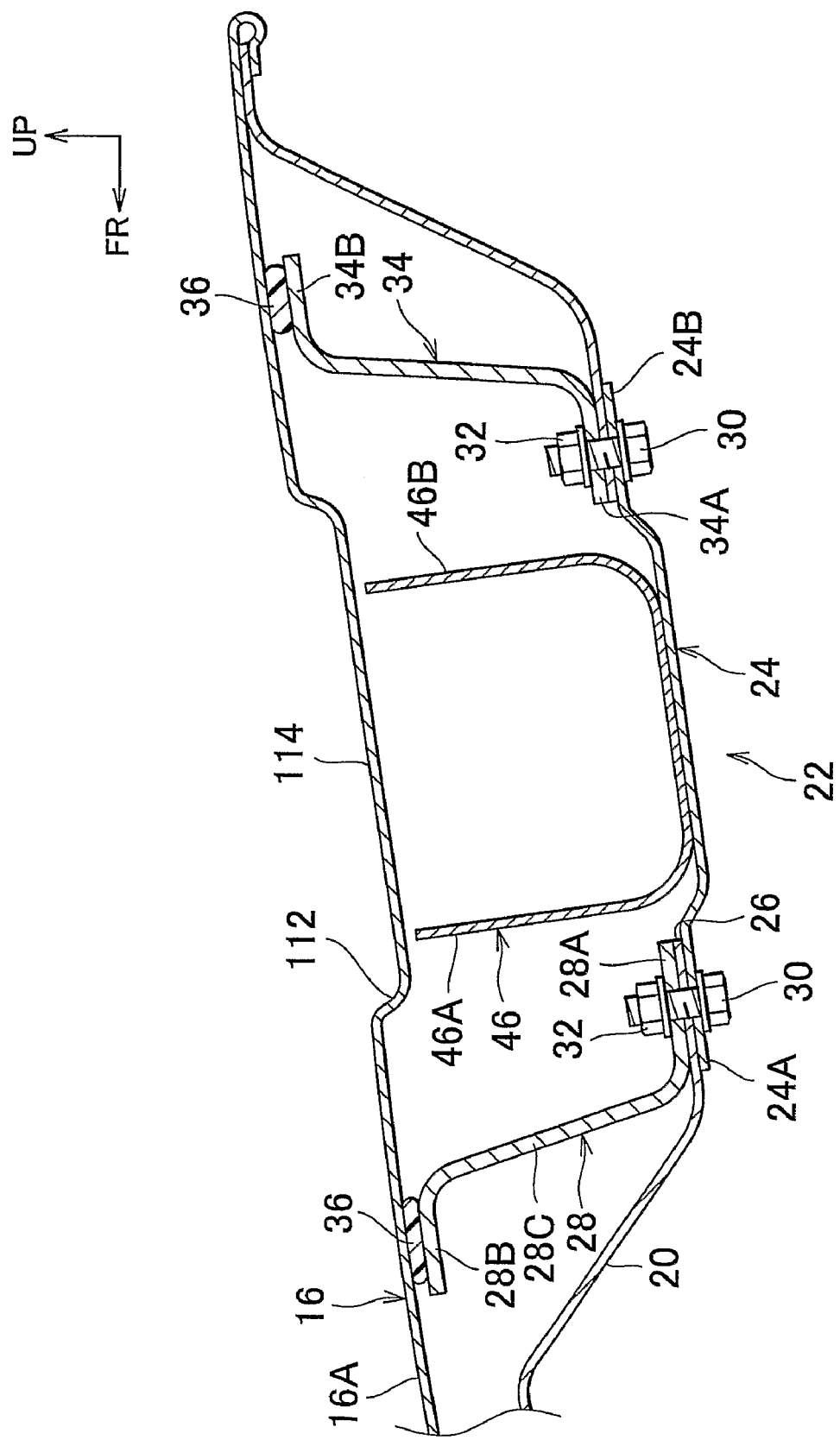

HOOD AIRBAG DEVICE FOR USE IN A VEHICLE

BACKGROUND OF THE INVENTION

1. Field of the Invention

The present invention relates to a hood airbag device that deploys an airbag over the hood of a vehicle when the vehicle collides with an impact object.

2. Background of the Invention

Japanese Patent Application Publication No. JP-A-7-232615 discloses a hood airbag device in which a pair of left and right airbags is deployed over the hood of a vehicle. Stated briefly, openings through which the airbags expand (hereinafter, referred to as "bag-expansion openings"), extend in the longitudinal direction of the vehicle and are formed on the right-hand side portion and the center portion of the outer hood panel as viewed from the passenger compartment. A right-hand side, as viewed from the passenger compartment, airbag is deployed through the right bag-expansion opening to cover the right half of a top surface of a hood, and a left-hand side, as viewed from the passenger compartment, airbag is deployed through the center bag-expansion opening to cover the left half of the top surface of the hood.

In the above-cited reference, the right airbag is deployed in such a way that it first expands upward, through the corresponding bag-expansion opening, by the pressure of a gas supplied from an inflator, and the leading end portion of the airbag then falls down toward the center of the hood. The left airbag is deployed in the same way as the right airbag. For this reason, there is room for improvement in terms of the following two points.

First, while the airbag deployment position at the base portion of the airbag closer to the bag-expansion opening can be controlled or restrained, it is difficult to control or restrain the deployment position of the leading end portion of the airbag distant from the bag-expansion opening. Thus, even if the leading end portion of the right airbag is fastened to the base portion of the left airbag by means of a face-to-face fastener or the like, the possibility still exists that the leading end portion of the right airbag may be raised up, particularly if the vehicle is moving and a wind pressure acts thereon. Such a possibility is increased if the leading end portion of the left airbag that remains unrestrained. Accordingly, it is desirable to enhance the ability of the prior art airbag device to suppress the airbag from being raised up by the wind pressure or other factors.

Secondly, due to the manner of deployment mentioned above, time is taken until the leading end portion of the right airbag falls down toward the base portion of the left airbag. For this reason, if a deployment extent of the airbag is set broad, it becomes difficult to deploy the airbag over the deployment extent quickly. Accordingly, the prior art airbag device has a room for improvement in that the airbag needs to be deployed quickly over a broad extent.

SUMMARY OF THE INVENTION

The present invention provides a hood airbag device that suppresses an airbag from being raised up by a wind pressure or the like and quickly deploying the airbag over a broad extent.

In accordance with an aspect of the present invention, there is provided a hood airbag device for use in a vehicle, including: a gas generating unit, arranged below a rear end portion of an outer hood panel serving as an outer plate of a hood, that discharges a gas when the vehicle makes a head-on collision with an impact object; and a left and right airbag, respectively stored in a folded state, below a left and right bag-expansion opening formed at the rear end portion of the outer hood panel in a hood width direction, the airbags adapted to be deployed through the respective bag-expansion openings by the gas supplied from the gas generating unit to cover at least the rear end portion of the outer hood panel and the cowl. In addition, the airbags are configured so that when the airbags are in a deployed, the hood-center side end portions of the airbags pressing against each other.

In accordance with the above aspect, when a vehicle collides with the impact object, such as a pedestrian, the gas discharged by the gas generating unit is supplied to the left and right airbags to inflate the airbags. Thus, the left and right airbags are deployed through the left and right bag-expansion openings such that they cover at least the rear end portion of the outer hood panel and the cowl. As a result, the impact object is received by the left and right airbags thus deployed. This ensures that the impact energy at the time of collision is absorbed by the airbags, thus reducing the reaction force of the vehicle body applied to the impact object.

In the present aspect, the left and right bag-expansion openings are formed at left and right sides in the rear end portion of the outer hood panel along the hood width direction, and the left and right airbags are deployed through the bag-expansion openings toward the rear end side of the hood so as to cover at least the rear end portion of the outer hood panel and the cowl. With such configurations, the deployment position of the left and right airbags are controlled or restrained over the areas where the left and right bag-expansion openings are formed. Only with such configurations, there is provided a more excellent effect of suppressing the rising movement of the airbags than in the configuration of the prior art reference mentioned in the section of "Background of the Invention".

If this configuration is adopted independently, however, it is impossible to control or restrain the deployment position as far as the hood-center side end portions lying between the left and right bag-expansion openings are concerned. Thus, in the present invention, the hood-center side end portions of the left and right airbags located at the center of the hood in the deployed condition are designed to press against each other. Such a pressing action creates a force that controls or restrains the deployment position even for the hood-center side end portions lying between the left and right bag-expansion openings.

In view of the foregoing, in accordance with the present aspect, when the left and right airbags are deployed, it is possible to control or restrain the deployment position of the airbags substantially over the entire extent in the bag width direction.

Accordingly, it is possible to effectively suppress the rising movement of the airbags, which would otherwise occur by the wind pressure or the like due to the motion of the vehicle.

Furthermore, in the present aspect, the left and right airbags are deployed through the left and right bag-expansion openings formed at the rear end portion of the outer hood panel in the hood width direction, thus covering the rear end portion of the outer hood panel and the cowl. This makes it possible to quickly deploy the airbags over a broad extent. In other words, in the hood airbag device disclosed in the prior art reference cited above, the bag-expansion openings are formed at the right-hand side portion and the center portion of the hood as viewed from the passenger compartment.

The left and right airbags are deployed in such a manner that they fall down in the hood width direction through the swing movement about axes extending in the longitudinal direction of the hood via the bag-expansion openings. For this reason, it is time-consuming to deploy the airbags onto the center area of the hood. As opposed to the prior art airbag device, in the present invention, the left and right bag-expansion openings are formed at the rear end portion of the outer hood panel along the hood width direction, and the left and right airbags are deployed in such a manner that they are expanded toward the rear side of the hood through the swing movement about axes extending in the hood width direction via the bag-expansion openings. This reduces the time within which the rear end portion of the outer hood panel and the cowl are covered by the left and right airbags. Thus, even if the deployment extent of the airbags is set broad, the airbags may be quickly deployed over the broadened extent of deployment.

It is preferred that each airbag include a main body portion for covering the rear end portion of the outer hood panel and the cowl and a bag extension portion, communicating with the main body portion, that covers at least a lower area of a front pillar.

With such an arrangement, it is possible to broaden the area for protecting the impact object because each of the airbags is comprised of the bag extension portion for covering at least the bottom area of the front pillar, as well as the main body portion for covering the rear end portion of the outer hood panel and the cowl.

Furthermore, two gas generating units may be provided that correspond to the left and right airbags, each gas generating unit may be arranged along a longitudinal direction of each of the bag-expansion openings and have a gas emission hole disposed near an outer end of the corresponding bag-expansion opening. With such an arrangement, the distance between the gas emission hole and the bag extension portion is shortened, thus making it possible to rapidly inflate the bag extension portion.

Preferably, the main body portion is comprised of a plurality of tubular cells that extend in the vehicle width direction, the tubular cells being arranged side by side in the longitudinal direction of the vehicle.

With such configuration, the main body portion is comprised of the plurality of tubular cells that extend in the vehicle width direction, the tubular cells being arranged side by side in the longitudinal direction of the vehicle. Thus, when the airbags are fully expanded to where the hood-center side end portions of the left and right airbags lying between the left and right bag-expansion openings press against each other, the cells are continuously arranged in the hood width direction at the rear end portion of the outer hood panel. This makes it hard for the main body portions of the airbags bend, thus providing increased resistance to the rising movement of the airbags.

Preferably, the left and right airbags are deployed in such a shape that the hood-center side end portions are bulged to have a thickness greater than that of other general portions of the airbags.

With such configurations, when the left and right airbags are deployed, the hood-center side end portions, whose thickness is greater than the remaining general portions, are pressed against each other. This increases the contact area of the airbags in the contact region in proportion to the increased thickness (the amount bulged upwardly), so that the frictional force between the airbags in the contact region is correspondingly increased. Consequently, the hood-center side end portions are hardly dislocated from each other in the bag thickness direction. Moreover, the amount of energy absorbed when the impact object collides with the contact region becomes higher in proportion to the bulging-up amount.

Alternatively, the left and right airbags may be deployed in such a shape that the hood-center side end portions are overlapped and engaged with each other in a bag thickness direction.

With such a configuration, when the left and right airbags are deployed, the hood-center side end portions are engaged (overlap) with each other in the bag thickness direction. Thus, even if the impact object collides with the contact region (juncture) of the left and right airbags, the hood-center side end portions of the left and right airbags can receive the impact object in a mutually engaged state. This assures energy absorption performance in the contact region of the left and right airbags.

Further, the left and right airbags may be deployed in such a shape that the hood-center side end portions overlap and are engaged with each other in a longitudinal direction of the vehicle.

With such a configuration, when the left and right airbags are deployed, the hood-center side end portions are engaged (overlap) with each other in the longitudinal direction of the vehicle. Thus, even if the impact object collides with the contact region (juncture) of the left and right airbags, the hood-center side end portions of the left and right airbags can receive the impact object in a mutually engaged state. This assures energy absorption performance in the contact region of the left and right airbags.

In addition, the left and right airbags may have confronting surfaces on which retainers are provided, respectively, the retainers adapted to interconnect the hood-center side end portions of the airbags by generating a retaining force to keep them in contact.

With such a configuration, when the left and right airbags are deployed, the hood-center side end portions are retained in contact by means of the retainer. Thus, even when the impact object collides with the contact region of the left and right airbags, the hood-center side end portions of the left and right airbags are kept in contact under the action of the retaining force of the retainer and can receive the impact object in a reliable manner. This assures energy absorption performance in the contact region of the left and right airbags.

Preferably, the left and right bag-expansion openings are openably closed by a pair of left and right covers, respectively.

With such a configuration, the left and right covers are paired to the corresponding left and right bag-expansion openings. This makes it easy to construct the extensible hinge portions about which the covers rotate. Specifically, in the case where the peripheral edges of the covers are curved in conformity with the curved shape of the lower edge of the windshield, it is necessary to add configurations that allow the covers to be opened quickly and smoothly, to the extensible hinge portions about which the covers rotate. In this case, if the covers have a reduced length in the vehicle width direction, the positional deviation of the covers caused by the curved axes of opening movement is reduced. This makes a design for adding the configurations easy.

Alternatively, an elongated recess extending in the vehicle width direction may be formed at the rear end portion of the outer hood panel, and the left and right bag-expansion openings may be formed to leave a cover attachment seat, the bag-expansion openings being openably closed by a single cover.

With such a configuration, because the bag-expansion openings are openably closed by the single cover, the design integrity of the outer hood panel is improved.

If the left and right bag-expansion openings are directly formed at the rear end portion of the outer hood panel without providing the recess, the corner portions of the bag-expansion openings are located together at the rear center of the outer hood panel.

Inasmuch as the cover attachment seat is formed at the corner portions, strain deformation is likely to occur at the corner portions. For this reason, if the corner portions of the bag-expansion openings are located together at the rear center of the outer hood panel, the influence of strain on the outer hood panel is increased, thus making it difficult to shape a smooth ornamental surface.

However, in the present invention, the elongated recess extending in the vehicle width direction is first formed at the rear end portion of the outer hood panel and then the left and right bag-expansion openings are formed at the opposite end regions of the recess so as to leave the cover attachment seat. Thus, even though the inner corner portions are gathered on the rear center of the outer hood panel, no cover attachment seat is formed at the inner corner portions, so that the strain deformation is difficult to occur. Even if a certain level of strain deformation occurs at the corner portions gathered on the rear center of the outer hood panel, the strain deformation cannot be seen from outside the outer hood panel because the recess is covered by the cover in its entirety. This improves the design integrity of the outer hood panel.

BRIEF DESCRIPTION OF THE DRAWINGS

The above and other objects and features of the present invention will become apparent from the following description of preferred embodiments, given in conjunction with the accompanying drawings, in which:

FIG. 9 is a partially enlarged top view corresponding to FIG. 5 but showing left and right airbags in accordance with a second example of the third embodiment as viewed from the top of a vehicle, which view depicting the situation that an impact object has collided against the area at which the left and right airbags come into abutment against each other at their hood-center side ends under a condition mutually engaged in a longitudinal direction of the vehicle;

FIG. 10 is a partially enlarged front elevational view corresponding to FIG. 5 but showing left and right airbags in accordance with a fourth preferred embodiment of the present invention as viewed from the front side of a vehicle, which view depicting the situation that an impact object has collided against the area at which the left and right airbags are fastened to each other at their hood-center side ends by means of a face-to-face fastener;

FIG. 11 is a partially enlarged perspective view of some major parts of a hood airbag device in accordance with an alternative embodiment of the present invention, illustrating left and right bag-expansion openings closed up with a single elongated airbag door extending in a vehicle width direction; and FIG. 12 is an enlarged side elevational cross-sectional view of the hood airbag device shown in FIG. 11, taken at the center of a hood in a front-rear direction of a vehicle (along the line 12-12 in FIG. 11).

DETAILED DESCRIPTION OF THE INVENTION

Figure 1:
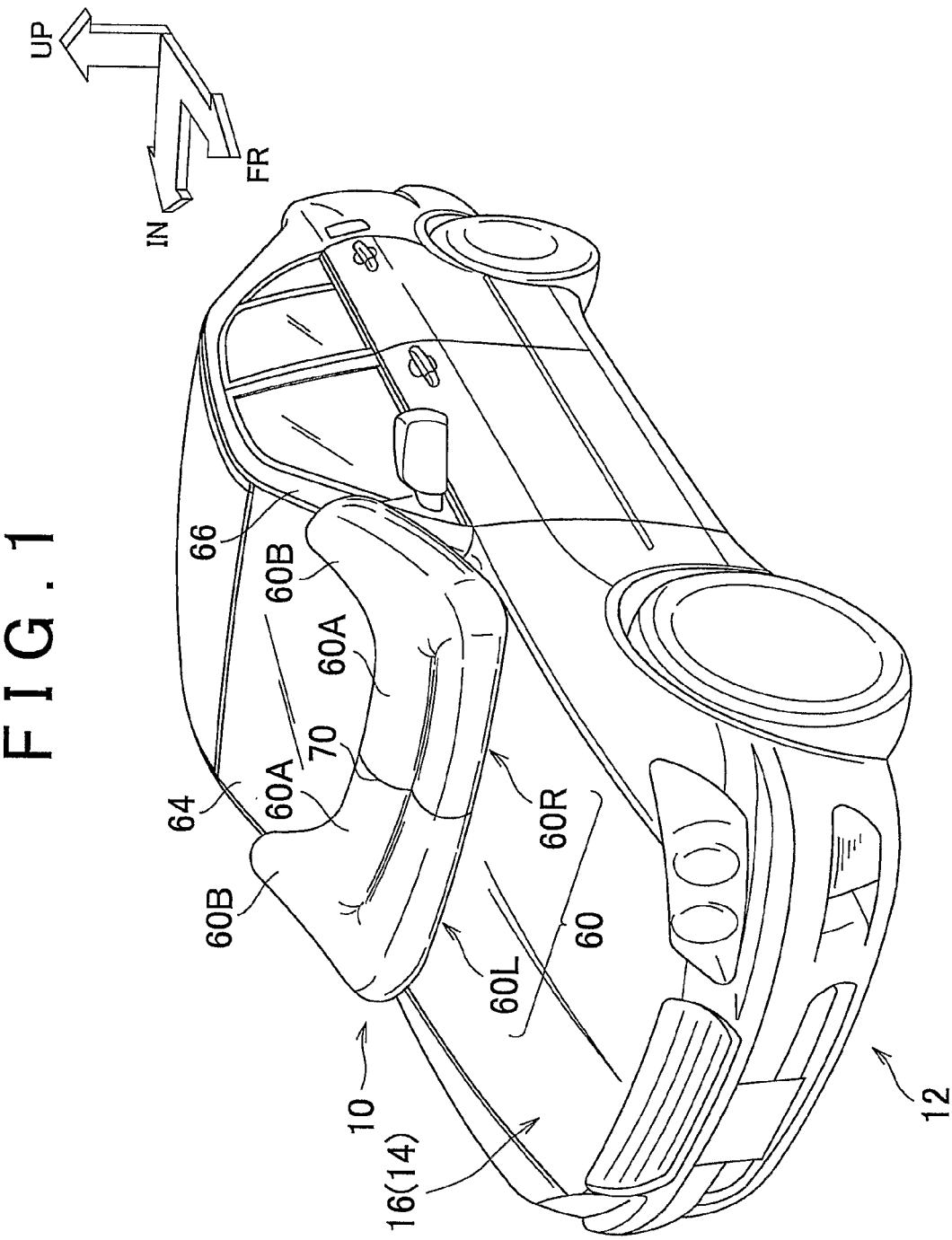
FIG. 1 is a perspective view of a vehicle showing a deployed hood airbag device in accordance with a first preferred embodiment of the present invention.

A hood airbag device 10 for use in a vehicle 12, in accordance with a first preferred embodiment of the present invention, will be described with reference to FIGS. 1 to 5. In the drawings, the arrow "FR" designates the front direction of the vehicle, the arrow "UP" denotes the upward direction of the vehicle and the arrow "IN" indicating the inward width direction of the vehicle.

Figure 2:
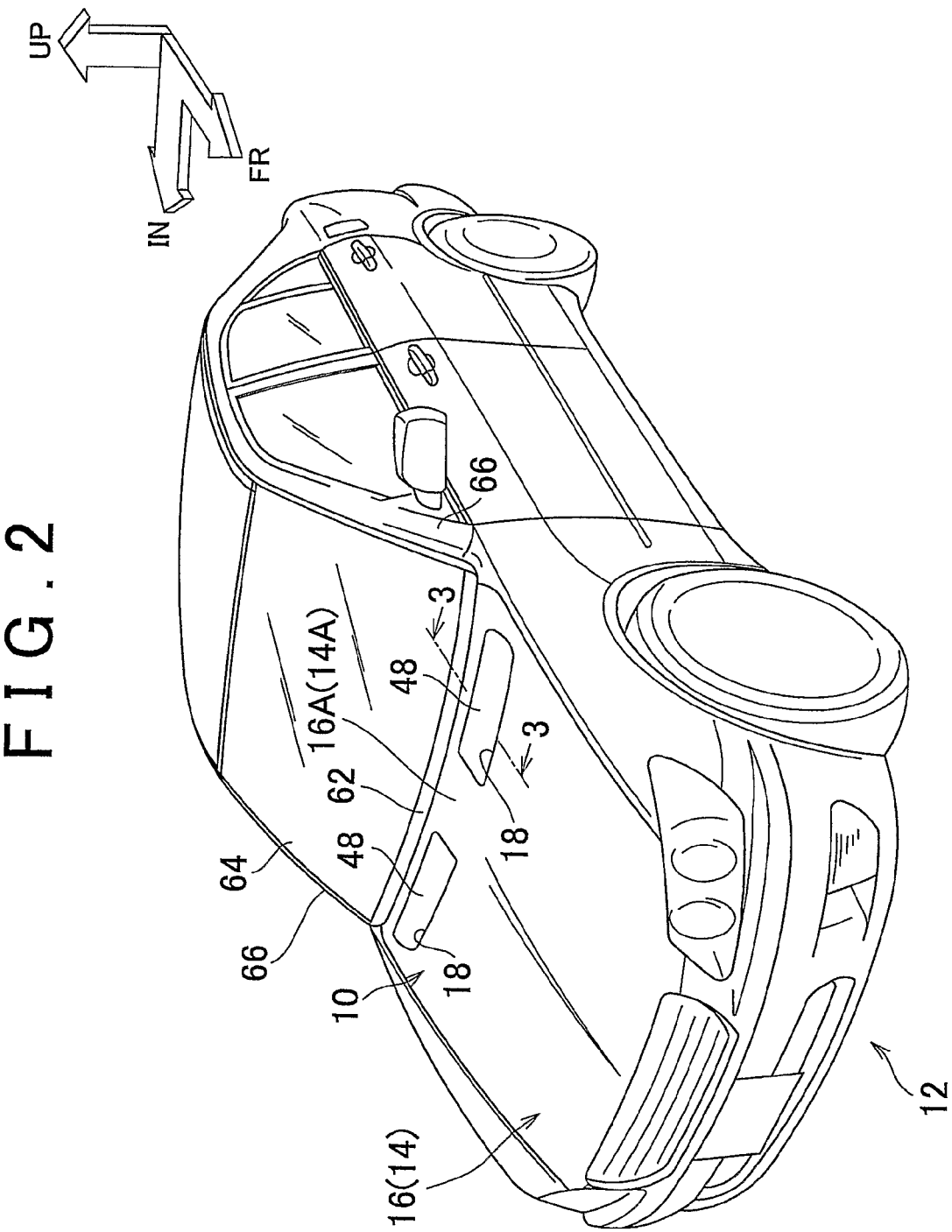
FIG. 2 is a perspective view of the vehicle illustrating the hood airbag device shown in FIG. 1 in before deployment state.
Figure 3:
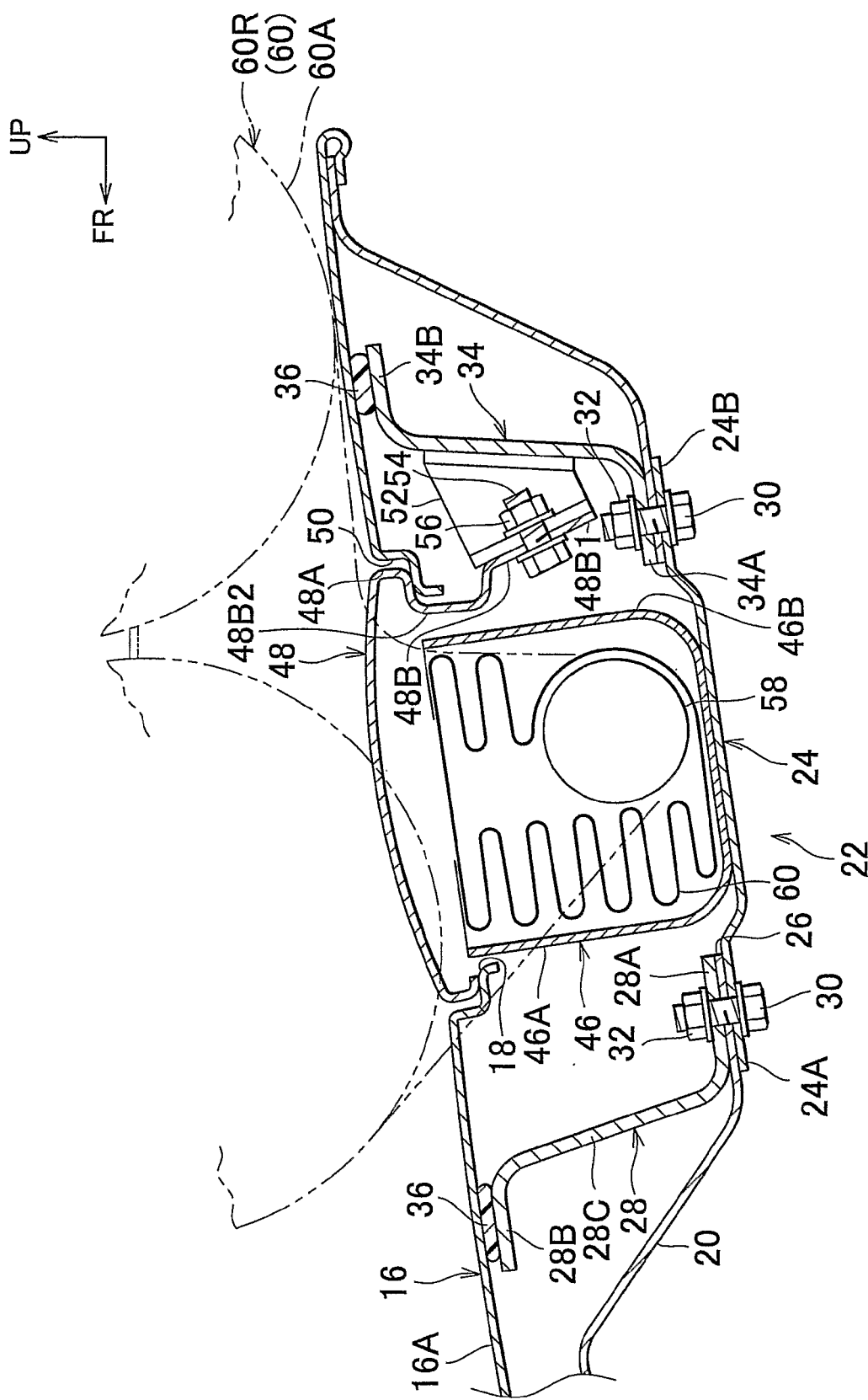
FIG. 3 is an enlarged side elevational cross-sectional view taken in a front-rear direction of the vehicle (along the line 3-3 in FIG. 2), illustrating the hood airbag device mounted in place.

FIG. 1 is a perspective view of the vehicle 12 shows the hood airbag device 10 after it is deployed. FIG. 2 is a perspective view of the vehicle 12 depicting the hood airbag device 10 before deployment. FIG. 3 is a side elevational cross-sectional view taken in the longitudinal direction of the vehicle (along the line 3-3 in FIG. 2), illustrating the hood airbag device 10 mounted in place.

As illustrated in FIGS. 1 to 5, the hood airbag device 10 is arranged along the width direction of the vehicle at the rear side of a hood 14 that openably closes an engine compartment. The hood 14 includes an outer hood panel 16 that serves as an outer plate and forming a design surface of the hood 14, and an inner hood panel 20 that is downwardly spaced apart from the outer hood panel 16 by a predetermined distance and serves as an inner plate of the hood 14.

Referring to FIG. 2, the outer hood panel 16 is provided at its rear opposite side areas with a pair of left and right bag-expansion openings 18 whose long sides extend in the vehicle width direction. The bag-expansion opening 18 is of a generally rectangular shape when viewed from above. As shown in FIG. 3, corresponding to the bag-expansion openings 18, a left and right internal hood apertures 26 that are shaped identically to the bag-expansion openings 18 are formed in the inner hood panel 20 in such positions as to face the bag-expansion openings 18, respectively.

Disposed below the left and right bag-expansion openings 18 are the left and right airbag modules 22 in a corresponding relationship with the bag-expansion openings 18. The airbag modules 22 are provided with lower plates 24 of high strength for closing the internal hood apertures 26 below the lower plates 24. Each of the lower plates 24 is larger than the corresponding internal hood aperture 26, as viewed from above. The lower plates 24 are contact the inner hood panel 20 from below the vehicle to close off the internal hood apertures 26, respectively.

Positioned in contact with the frontal edge areas around the internal hood apertures 26 of the inner hood panel 20 is a lower end portion 28A of an elongated front reinforcement 28 that has a generally "Z"-like shape as viewed from the side. The lower end portion 28A of the front reinforcement 28 and a front end portion 24A of each of the lower plates 24 are jointly fastened to the inner hood panel 20 together by means of bolts 30 and nuts 32. Similarly, positioned in contact with the rear edge areas around the internal hood apertures 26 of the inner hood panel 20 is a lower end portion 34A of a rear reinforcement 34 that has a generally "Z"-like shape as viewed from the side. The lower end portion 34A of the rear reinforcement 34 and a rear end portion 24B of each of the lower plates 24 are jointly fastened to the inner hood panel 20 by means of bolts 30 and nuts 32. Furthermore, an upper end portion 28B of the front reinforcement 28 and an upper end portion 34B of the rear reinforcement 34 are bonded to the back surface of the outer hood panel 16 by using a fixture means, such as an adhesive agent (e.g., mastic) 36.

One of the reasons for providing the front and the rear reinforcement 28 and 34 is to make up for the reduction in rigidity of the inner hood panel 20 caused by the formation of the internal hood apertures 26, and another reason is to fixedly secure the airbag modules 22 in a closed space of the hood 14 defined by the outer hood panel 16 and the inner hood panel 20. The front and the rear reinforcement 28 and 34 may be formed of two independent members or may be interconnected at their longitudinal opposite ends so as to form a single frame member as viewed from above.

The area of the lower plate 24 facing the internal hood aperture 26 is slightly recessed in the downward direction of the vehicle. Attached to the slightly recessed area of the lower plate 24 is a metallic airbag case 46 of a generally box-like shape with its top end opened and having a front wall 46A and a rear wall 46B. The airbag case 46 is so provided as to extend over the left and right airbag modules 22. In other words, the airbag case 46 is not bisected left and right and has a longitudinal dimension great enough to accommodate the left and right airbag modules 22.

Figure 4:
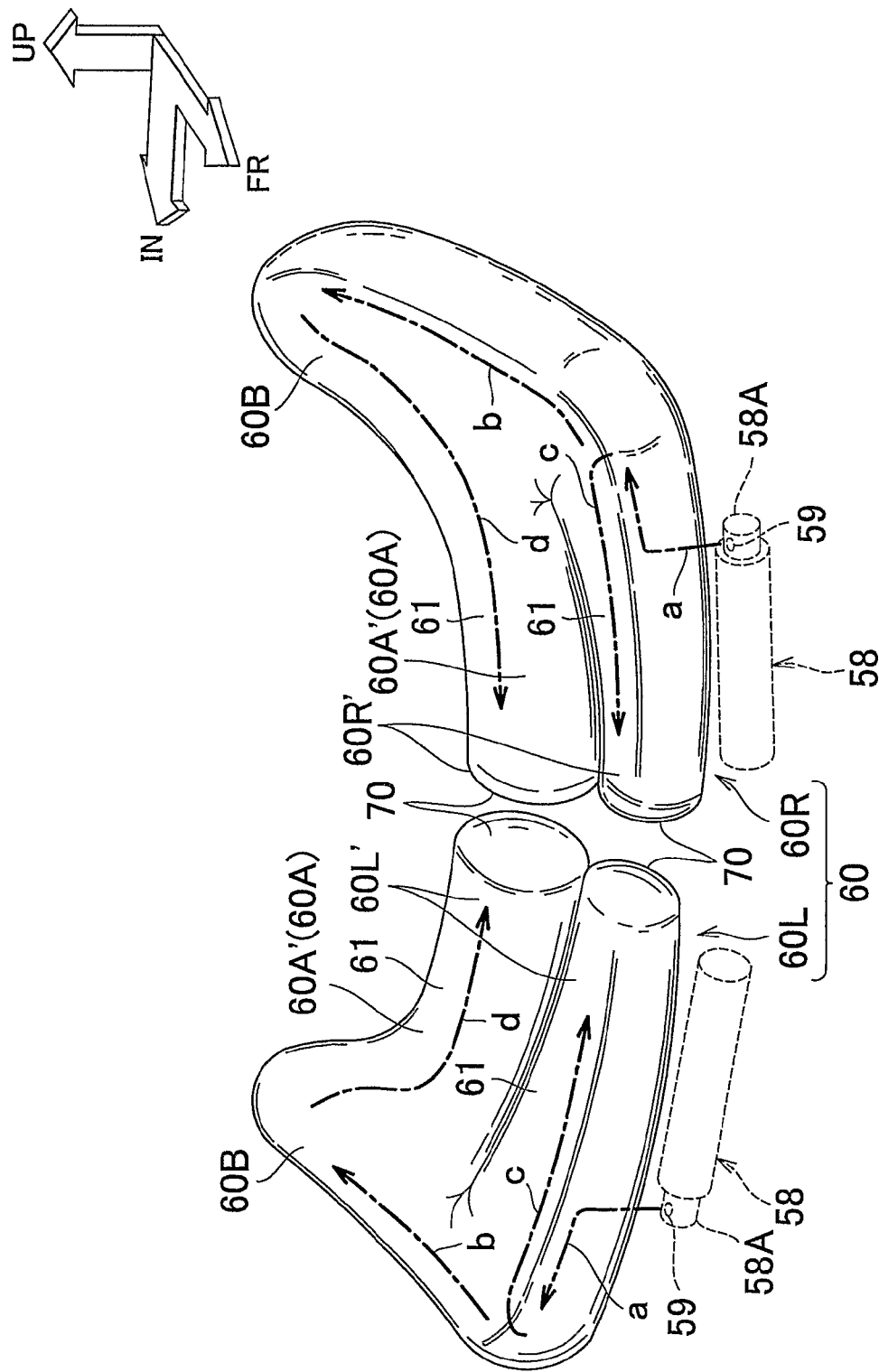
FIG. 4 is an enlarged perspective view illustrating left and right bisected airbags shown in FIG. 1 in a mutually spaced-apart relationship.

An inflator 58 of a generally cylindrical shape that serves as a gas generating means is placed within the airbag case 46 with its longer side extending in the vehicle width direction (see FIG. 4). Also accommodated within the airbag case 46 is an airbag 60, folded in a prescribed folding manner. More exactly, the inflator 58 is fixed to the airbag case 46 and the lower plate 24 under the state that it is accommodated into the folded airbag 60.

The inflator 58 may be a mechanically triggered type or an electrically triggered type. Furthermore, the inflator 58 may be filled with either a gas generating material or a high-pressure gas. As can be seen in FIG. 4, the inflator 58 has a smaller diameter. portion 58A at one axial end (an outer end in the vehicle width direction) thereof. A plurality of gas emission holes 59 are formed in a surrounding wall portion of the smaller diameter portion 58A along a circumferential direction of the inflator 58. Although only one of the gas emission holes 59 is illustrated at the top area of the smaller diameter portion 58A in FIG. 4, it should be noted that they are actually formed at plural locations.

In the meantime, the bag-expansion opening 18 of the our hood panel 16 facing the opened end of the airbag case 46 is openably closed by a metallic airbag door 48. Specifically, the bag-expansion opening 18 is formed in a recessed portion 50 of the outer hood panel 16. The recessed portion 50 is one-step downwardly recessed from the general surface 16A of the outer hood panel 16. The airbag door 48 has a thickness and size enough to fit in the stepped-down portion 50. An extensible hinge 48B is integrally formed with a rear end portion 48A of the airbag door 48, the extensible hinge 48B and the rear end portion 48A being of a generally arched shape. Although the airbag door 48 is made of metal in the illustrated embodiment, it may be a two-layered structure comprised of a metallic base panel and a resin layer overlaid on the base panel.

A plurality of the extensible hinges 48B are provided at regular intervals along the width direction of the airbag door 48. In a corresponding relationship with the extensible hinge 48B, brackets 52 are fixedly secured to the rear reinforcement 34 at positions corresponding to the extensible hinges 48B. The extensible hinge 48B has a lower end portion 48B1 affixed to the bracket 52 by means of a bolt 54 and a nut 56. Accordingly, if the vehicle is involved in a frontal collision, the airbag door 48 unfolds to one side toward the rear of the vehicle by the inflating pressure of the airbag 60 about the fastening point of the bolt 54 and the nut 56, while plastically deforming a generally C-shaped central portion 48B2 of the extensible hinge 48B.

In this embodiment, as described above, the left and right bag-expansion openings 18 are formed in the rear end portion of the outer hood panel 16. The left and right airbag doors 48 are fitted onto the bag-expansion openings 18, respectively. The left and right airbag modules 22, which share the airbag case 46, are respectively disposed below the airbag doors 48. Accordingly, the inflator 58 and the airbag 60 that form major parts of the airbag module 22 are provided at both the left and right sides. For the purpose of convenience in description, the airbags 60 positioned left and right as viewed from the front side of the vehicle will be referred to as "left airbag 60L" and "right airbag 60R", respectively, if it is needed to distinguish them from each other.

The left airbag 60L is formed in a generally "L"-shape as viewed from above, while the right airbag 60R has a generally inverted "L"-shape as viewed from above. Under a deployed condition, the left and right airbags 60 have a generally "U"-shape as a whole with its rear side opened toward the rear side of the vehicle when viewed from above. Accordingly, in the event that the left and right airbags 60 have been deployed as illustrated in FIGS. 1 and 4, the rear end portion 14A of the hood 14 and the cowl 62 (also the lower end portion of a windshield 64) are covered by main body portions 60A each of which is formed with a plurality of cells 61 (two, front and rear, cells in the drawings) and spreads flat in the vehicle width direction. Further, the lower areas of front pillars 66 are covered by a pair of left and right extension portions 60B communicating with the side end portions of the main body portions 60A and extending toward the front pillars 66, respectively. Each of the front and rear cells 61 has a cylindrical shape elongated in the vehicular width direction, and each end portion of the front and rear cells, which is located at outer side in the vehicular width direction, is communicated with each of the left and right extension portions 60B. On the other hand, the inflator 58 is disposed inside of the front cells 61 of the left airbag 60L and the right airbag 60R so that the gas emission holes 59 are located at outer side in the vehicular width direction (at a side closer to the extension portions 60B).

Figure 5:
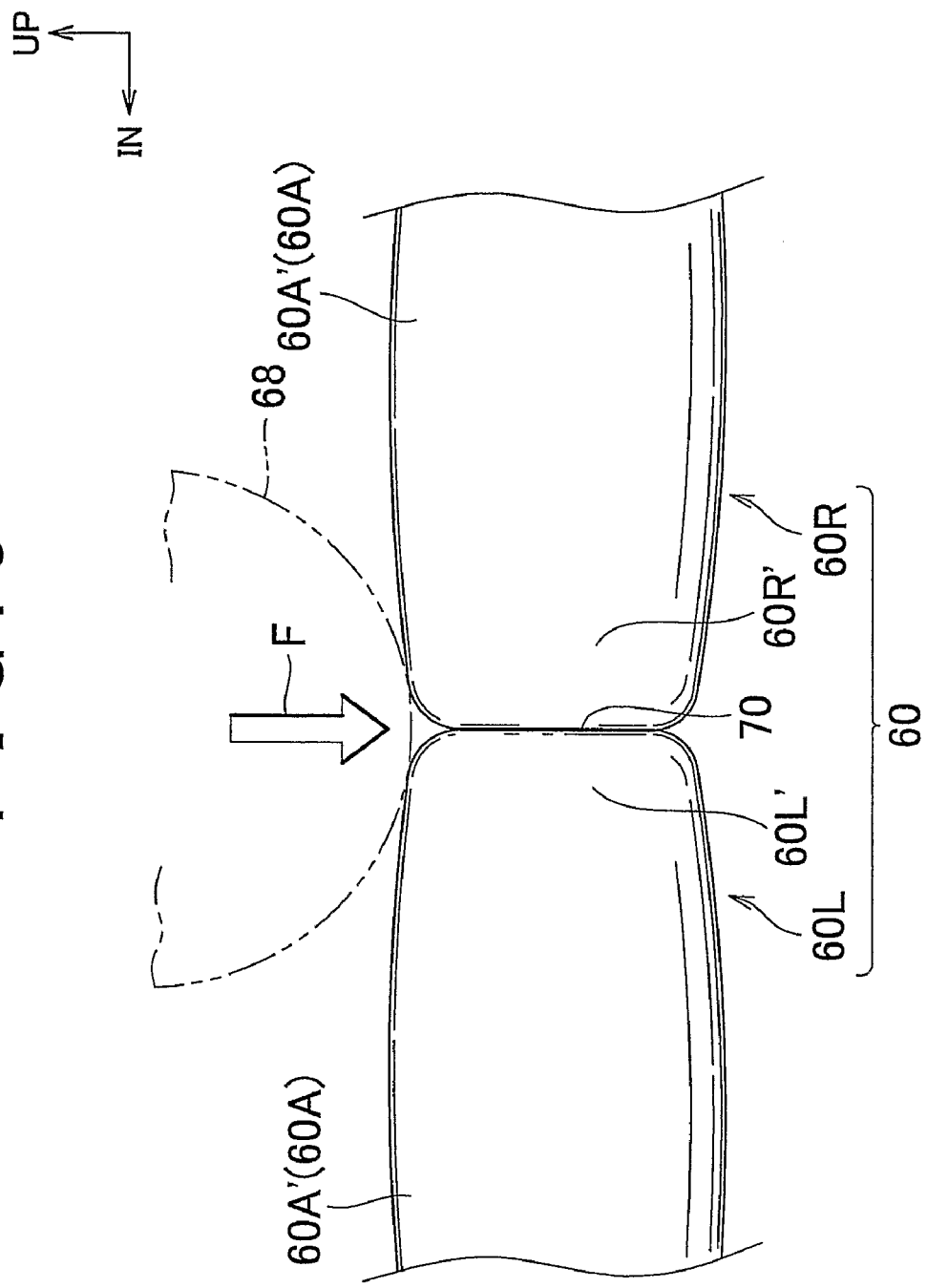
FIG. 5 is a partially enlarged front elevational view of the left and right airbags as viewed from the front side of the vehicle, depicting the state that an impact object has collided against the area at which the left and right airbags come into abutment against each other at their hood-center side ends.

As illustrated in FIGS. 4 and 5, the airbags 60 are bisected into left and right ones in such size and shape that, when deployed, the hood-center side end 60L' of the left airbag 60L comes into contact with the hood-center side end 60R' of the right airbag 60R, whereby the hood-center side end 60L' and the hood-center side end 60R' come to press against each other. More specifically, when the left and right airbags 60 have been deployed, the hood-center side end 60L' of the left airbag 60L and the hood-center side end 60R' of the right airbag 60R butt against each other in a bag width direction (the vehicle width direction) under the action of the inflating pressure of the airbags 60, at which time the contact region 70 has a generally flat shape.

Next, an operation and effect of the hood airbag device in accordance with the first embodiment of the present invention will be described.

If the vehicle 12 makes a head-on collision with an impact object, e.g. a pedestrian, the left and right inflators 58 are actuated to discharge a gas through the plurality of gas emission holes 59. This inflates the left and right airbags 60 stored in a folded state within the airbag case 46, so that the airbags 60 press upon the corresponding airbag doors 48 from below. When the inflating pressure exerted on the airbag doors 48 reaches a predetermined value, the left and right airbag doors 48 are unfolded outside the hood 14 (toward the windshield 64) about the extensible hinge 48B to open the left and right bag-expansion openings 18 formed at the rear side portion of the hood 14, respectively, and, as illustrated in FIG. 1, the left and right airbags 60 are deployed into a generally "U"-shape as viewed from above.

Below, the process of inflation and deployment of the airbags 60 (gas flow process) will be described in further detail. As depicted in FIG. 4, the gas is first discharged in an upward direction of the vehicle from the gas emission holes 59 of the inflators 58 and then flows laterally outwardly through the front cells 61 (the flow of gas at this time is designated by the arrow "a"). Subsequently, the gas impinges against the outer ends of the front cells 61 and turns toward the bag extension portions 60B, thus inflating and expanding the bag extension portions 60B for the very first time (the flow of gas at this time is designated by the arrow "b"). In parallel, a part of the gas impinging on the outer ends of the front cells 61 runs toward the inner ends thereof to inflate and expand the front cells 61 (the flow of gas at this time is designated by the arrow "c").

Finally, the gas that has inflated the bag extension portions 60B runs backward and flows into the rear cells 61 to thereby inflate and expand the rear cells 61 (the flow of gas at this time is designated by the arrow "d")

As a consequence, the landing of the impact object 68, such as a pedestrian, onto the hood 14 will be cushioned by the main body portions 60A or the extension portions 60B of the airbags 60 thus deployed. This ensures that the impact energy (the impact force designated by the arrow "F" in FIG. 5) at the time of collision is absorbed by the airbags 60, thus reducing the reaction force of the vehicle body applied to the impact object 68.

In this embodiment, the left and right bag-expansion openings 18 are formed at the rear end portion of the outer hood panel 16 along the hood width direction, and the left and right airbags 60 are deployed through the bag-expansion openings 18 toward the rear end side of the hood 14 so as to cover the rear end portion 16A of the outer hood panel 16 and the cowl 62. With such a configuration, the deployment position of the left and right airbags 60 are controlled or restrained over the formation extent of the left and right bag-expansion openings 18. Only with such configurations, there is provided a more excellent effect of suppressing the rising movement of the airbags than in the configuration of the prior art reference mentioned in the section of "Background of the Invention".

If this configuration is adopted independently, however, it is impossible to control or restrain the deployment position as far as the hood-center side end portion 60L' of the left airbag 60L and the hood-center side end portion 60R' of the right airbag 60R lying between the left and right bag-expansion openings 18 are concerned. Thus, in this embodiment, the hood-center side end portion 60L' of the left airbag 60L and the hood-center side end portion 60R' of the right airbag 60R are designed to press against each other on and above the top surface of the outer hood panel 16 between the left and right bag-expansion openings. 18, when the airbags 60 is in a deployed condition. Such a pressing action creates a force that controls or restrains the deployment position even for the hood-center side end portion 60L' of the left airbag 60L and the hood-center side end portion 60R' of the right airbag 60R lying between the left and right bag-expansion openings 18.

As is apparent from the foregoing, this embodiment ensures that, when the left and right airbags 60 are deployed, the deployment position of the airbags 60 is controlled or restrained substantially over the entire extent in the bag width direction. Accordingly, it is possible to effectively suppress the rising movement of the airbags 60, which would otherwise occur by the wind pressure or the like due to the motion of the vehicle.

Furthermore, in this embodiment, since the left and right airbags 60 are deployed through the left and right bag-expansion openings 18 formed at the rear end portion of the outer hood panel 16 in the hood width direction, thus covering the rear end portion 16A of the outer hood panel 16 and the cowl 62, it is possible to quickly deploy the airbags 60 over a broad extent. In other words, in the hood airbag device disclosed in the prior art reference cited above, the bag-expansion openings are formed on the right-hand side portion and the center portion of the hood as viewed from the passenger compartment, and the left and right airbags are deployed in such a manner that they fall down in the hood width direction through the swing movement about axes extending in the longitudinal direction of the hood via the bag-expansion openings. For this reason, it is time-consuming to deploy the airbags on the center area of the hood. As opposed to the prior art airbag device, in this embodiment, the left and right bag-expansion openings 18 are formed at the rear end portion of the outer hood panel 16 along the hood width direction, and the left and right airbags 60 are deployed in such a manner that they expand toward the rear of the hood through the swing movement about axes extending in the hood width direction via the bag-expansion openings 18. This shortens the time within which the rear end portion 16A of the outer hood panel 16 and the cowl 62 are covered by the left and right airbags 60. Thus, even if the deployment extent of the airbags 60 is set broad, there is no problem in quickly deploying the airbags 60 over the broadened extent of deployment.

As described above, in accordance with the hood airbag device 10 of this embodiment, it is possible to suppress the airbags 60 from being raised up by a wind pressure or the like and also to quickly deploy the airbags 60 over a broad extent.

Furthermore, in the hood airbag device 10 of this embodiment, the left and right airbags 60 include not only the main body portions 60A for covering the rear end portion 16A of the outer hood panel 16 and the cowl 62 but also the bag extension portions 60B for covering at least the lower areas of the front pillars 66. This makes it possible to broaden the area for protecting the impact object such as a pedestrian or the like.

In addition, the inflators 58 are provided along the longitudinal direction of the bag-expansion openings 18 to correspond to the left and right airbags 60, and the gas emission holes 59 are disposed in the vicinity of the outer ends of the bag-expansion openings 18. This reduces the distance between the gas emission holes 59 and the bag extension portions 60B. Accordingly, it becomes possible to rapidly supply the gas into the bag extension portions 60B, quickly covering the lower areas of the front pillars 66.

Moreover, in the hood airbag device 10 of this embodiment, the main body portions 60A of the airbags 60 are comprised of the plurality of tubular cells 61 extending in the vehicle width direction and arranged side by side in the longitudinal direction of the vehicle. Thus, when the airbags 60 are fully expanded state, the hood-center side end portion 60L' of the left airbag 60L and the hood-center side end portion 60R' of the right airbag 60R lying between the left and right bag-expansion openings 18 press against each other, the left and right cells 61 act as if they are united together, making it hard for the main body portions 60A of the airbags 60 to be bent. This provides increased resistance to the rising movement of the airbags 60. As a result, in this embodiment, it is possible to more effectively suppress any rising movement of the airbag that would otherwise occur by a wind pressure or the like due to the movement of the vehicle.

In addition, the hood airbag device 10 of this embodiment provides the advantageous effects as follows.

In case of broadening the deployment extent of the airbags, it may be contemplated to form a single elongated bag-expansion opening of a large size at the rear end portion of the outer hood panel in the hood width direction. However, the formation of such a large-sized opening may deteriorate the figure accuracy of the outer hood panel 16 to adversely affect the design integrity of the vehicle. In the hood airbag device 10 of this embodiment, since the bag-expansion openings 18 formed at the rear end portion of the outer hood panel in the hood width direction are bisected into left and right ones, it is possible to reduce the area of each bag-expansion opening 18 and also to shorten the length thereof in the hood width direction. Thus, the figure accuracy of the outer hood panel 16 can be secured in this embodiment. This is particularly true in case of aluminum hoods, which tend to exhibit a reduced figure accuracy when a large-sized opening is formed therein.

Furthermore, in the hood airbag device 10 of this embodiment, the airbag doors 48 are bisected into left and right ones and the airbags 60 are also divided into the left airbag 60L and the right airbag 60R, so that the deployment extent of the airbags 60 can be broadened without marring the advantages attained by the division of the bag-expansion openings 18 into left and right ones.

As can be seen from the foregoing, this embodiment ensures that the outer hood panel 16 is formed with a high degree of accuracy, while broadening the deployment extent of the airbags 60. Such formation of the outer hood panel 16 with a high degree of accuracy leads to an increased figure accuracy of the outer hood panel 16, thereby maintaining good design integrity with the hood 14.

If the airbags 60 are bisected into left and right ones and expanded into deployment positions in the manner as described above, there is a possibility that the contact region 70 of the left airbag 60L and the right airbag 60R (the juncture of the left and right airbags 60) may show a shock-absorbing performance less than that of the remaining general regions 60A'. In the hood airbag device 10 of this embodiment, when the left and right airbags 60 are deployed, the hood-center side end 60L' of the left airbag 60L and the hood-center side end 60R' of the right airbag 60R are adapted to press against each other in a bag width direction under the action of the inflating pressure of the airbags 60. This increases the frictional force at the contact region 70 and hence enhances the unification of the left and right airbags 60L and 60R. In other words, a shear resistance is increased at the contact regions 70, i.e., between the hood-center side ends 60L' and 60R'.

This reduces the possibility that the hood-center side ends 60L' and 60R' will be mutually dislocated in the bag thickness direction. As a result, even when the impact object 68 collides with the contact region 70, there is no reduction in the amount of shock energy absorption and it is, therefore, possible to make the contact region 70 have the same energy absorption performance as in the other regions of the airbags 60, i.e., the general regions 60A'. Accordingly, in accordance with this embodiment, an excellent energy absorption performance can be obtained over the entire extent of the airbags 60 in the vehicle width direction, even when the airbags 60 are bisected into left and right ones to secure the figure accuracy of an ornamental surface of the outer hood panel 16.

Furthermore, in this embodiment, the airbags 60 are bisected into the left airbag 60L and the right airbag 60R such that, when they are deployed, the hood-center side end 60L' of the left airbag 60L and the hood-center side end 60R' of the right airbag 60R impinge or press against each other. This embodiment refrains from adopting other means than the above, e.g. from forming the hood-center side end 60L' of the left airbag 60L and the hood-center side end 60R' of the right airbag 60R into a specific shape. Thus, there is no need to make the airbags 60 different in their body shape (base fabric shape), so that it is possible to assure the energy absorption performance in the contact region 70 of the left airbag 60L and the right airbag 60R with a simple configuration.

Hereinafter, a hood airbag device in accordance with a second embodiment of the present invention will be described with reference to FIGS. 6 and 7. The same parts or components as in the first embodiment described above will be designated by like reference numerals, and descriptions thereon will be omitted.

The hood airbag device of the second embodiment is characterized in that the hood-center side end portions of the left and right airbags are formed into a thicker bulge shape than the remaining general regions.

Figure 6:
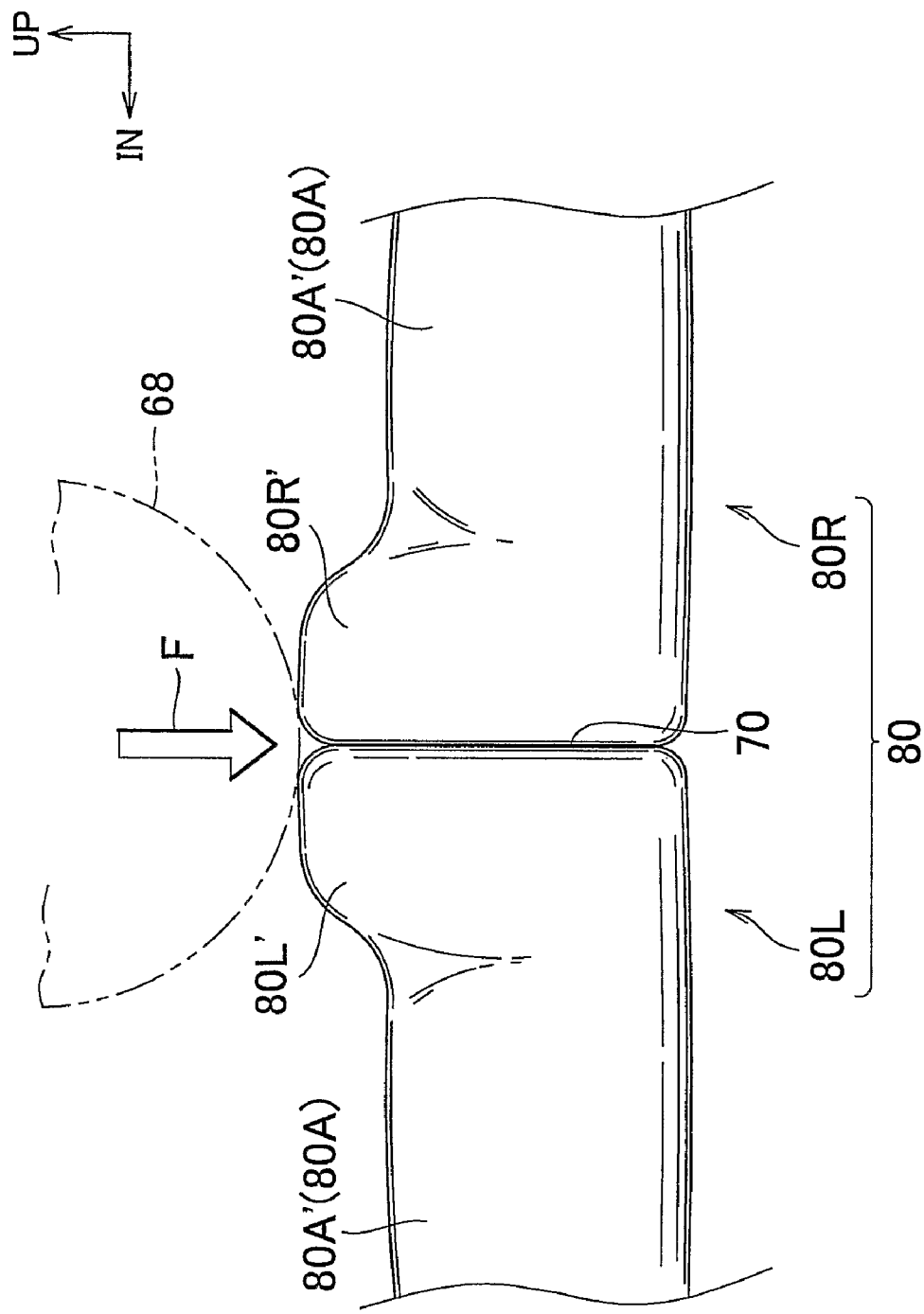
FIG. 6 is a partially enlarged front elevational view corresponding to FIG. 5 but showing left and right airbags in accordance with a first example of a second preferred embodiment of the present invention as viewed from the front side of a vehicle, which view depicting the situation that an impact object has collided against the area at which the left and right airbags come into abutment against each other at their hood-center side ends.

Specifically, in the first example of the second embodiment illustrated in FIG. 6, the hood-center side end 80L' of the left airbag 80L and the hood-center side end 80R' of the right airbag 80R have a swelling and protruding shape bulged in an upward direction of the hood. Base fabrics forming the left and right airbags 80 are so cut and sewn as to provide the swelling and protruding shape. In this way, the hood-center side ends 80L' and 80R' are thicker than the remaining general regions 80A' of the main body portions 80A.

Figure 7:
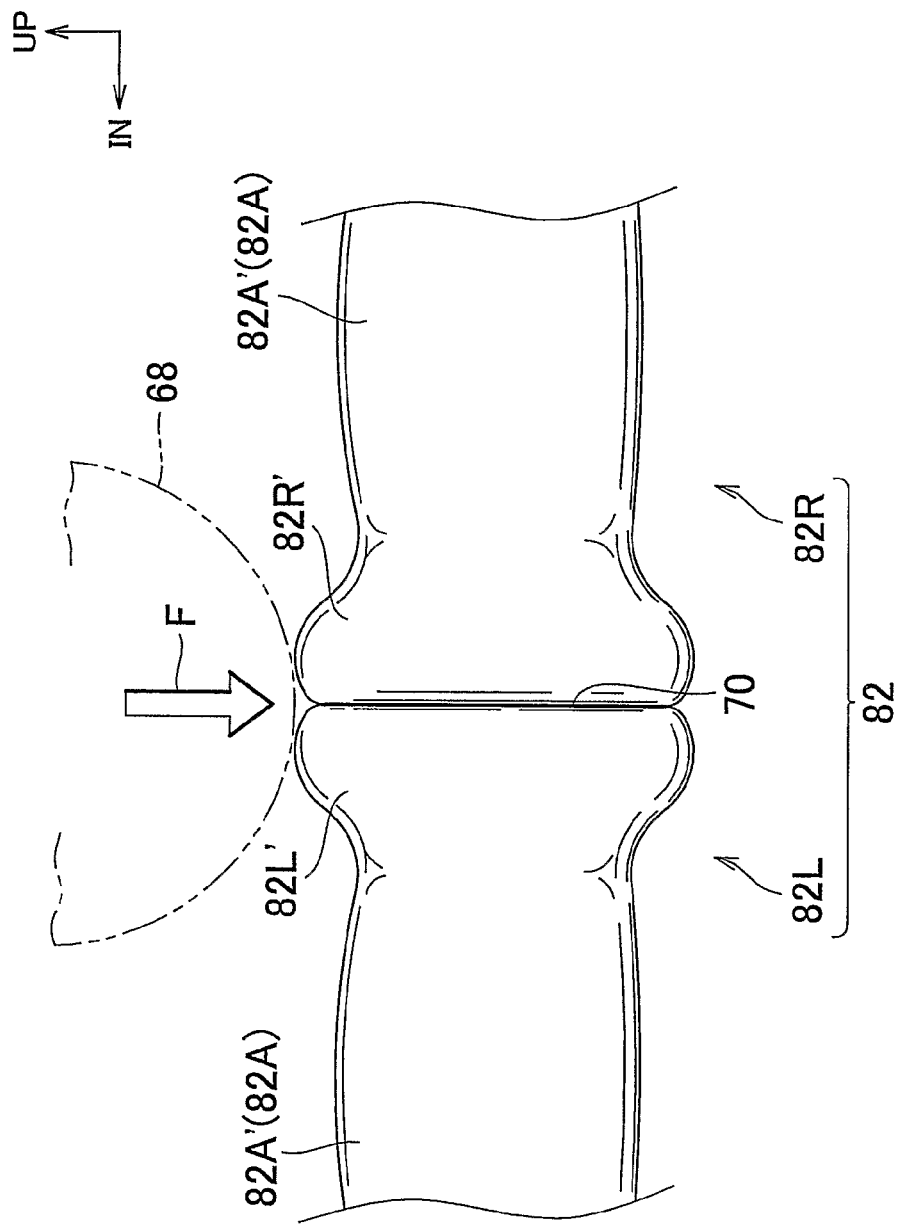
FIG. 7 is a partially enlarged front elevational view corresponding to FIG. 5 but showing left and right airbags in accordance with a second example of the second embodiment as viewed from the front side of a vehicle, which view depicting the situation that an impact object has collided against the area at which the left and right airbags come into abutment against each other at their hood-center side ends.

Meanwhile, in the second example of the second embodiment depicted in FIG. 7, the hood-center side end 82L' of the left airbag 82L and the hood-center side end 82R' of the right airbag 82R are greater in diameter than the tubular cells forming the remaining general regions 82A' of the main body portions 82A. Thus, if the left and right airbags 82 are inflated in a mutually spaced-apart condition, the hood-center side end 82L' of the left airbag 82L and the hood-center side end 82R' of the right airbag 82R are all expanded into a spherical shape. In other words, base fabrics forming the left and right airbags 82 are so cut and sewn as to provide the spherical ends. In this way, the hood-center side ends 82L' and 82R' are made thicker than the remaining general regions 82A' of the main body portions 82A both in an upward direction and in a downward direction.

With the arrangement illustrated in FIG. 6, when the left and right airbags 80 are deployed, the hood-center side ends 80L' and 80R' formed thicker than the remaining general regions 80A' are brought into contact with (pressed against) each other.

This increases the contact area of the airbags 80 in the contact region 70 in proportion to the increased thickness (the amount bulged in the upward direction of the hood), so that the frictional force between the airbags 80 in the contact region 70 is correspondingly increased. Consequently, the hood-center side ends 80L' and 80R' are hardly dislocated from each other in the bag thickness direction. Moreover, the amount of energy absorbed when the impact object 68 collides with the contact region 70 increases in proportion to the bulging-up amount at the hood-center side ends 80L' and 80R'.

With the arrangement depicted in FIG. 7, when the left and right airbags 82 are deployed, the hood-center side ends 82L' and 82R' of a spherical shape greater in diameter than the remaining general regions 82A' are brought into contact with (pressed against) each other. This increases the contact area of the airbags 82 in the contact region 70 in proportion to the excess thickness (the amount bulged in the upward and downward directions of the hood), so that the frictional force between the airbags 82 in the contact region 70 is correspondingly increased. As a consequence, the hood-center side ends 82L' and 82R' are hardly dislocated from each other in the bag thickness direction. In particular, the thickness of the hood-center side ends 82L' and 82R' of the airbags 82 depicted in FIG. 7 is increased not only in the upward direction but also in the downward direction of the hood, and therefore the hood-center side ends 82L' and 82R' make contact with each other over a greater contacting area than the hood-center side ends 80L' and 80R' shown in FIG. 6. This further reduces the likelihood that the hood-center side ends 82L' and 82R' will be dislocated from each other in the bag thickness direction. In addition, the amount of energy absorbed when the impact object 68 collides with the contact region 70 increase in proportion to the bulging-up amount at the hood-center side ends 82L' and 82R'.

As is apparent from the foregoing, the second embodiment increases the frictional force in the contact region 70 and improves the energy absorption performance.

As a result, it is possible to assure the energy absorption performance in the contact region 70 of the left and right airbags 80 and 82.

Hereinafter, the hood airbag device in accordance with a third preferred embodiment of the present invention will be described with reference to FIGS. 8 and 9. The same parts or components as in the first embodiment described earlier will be designated by like reference numerals, and descriptions thereon will be omitted.

The hood airbag device of the third embodiment is characterized in that the hood-center side end portions of the left and right airbags overlap to engage with each other in the bag thickness direction.

Figure 8:
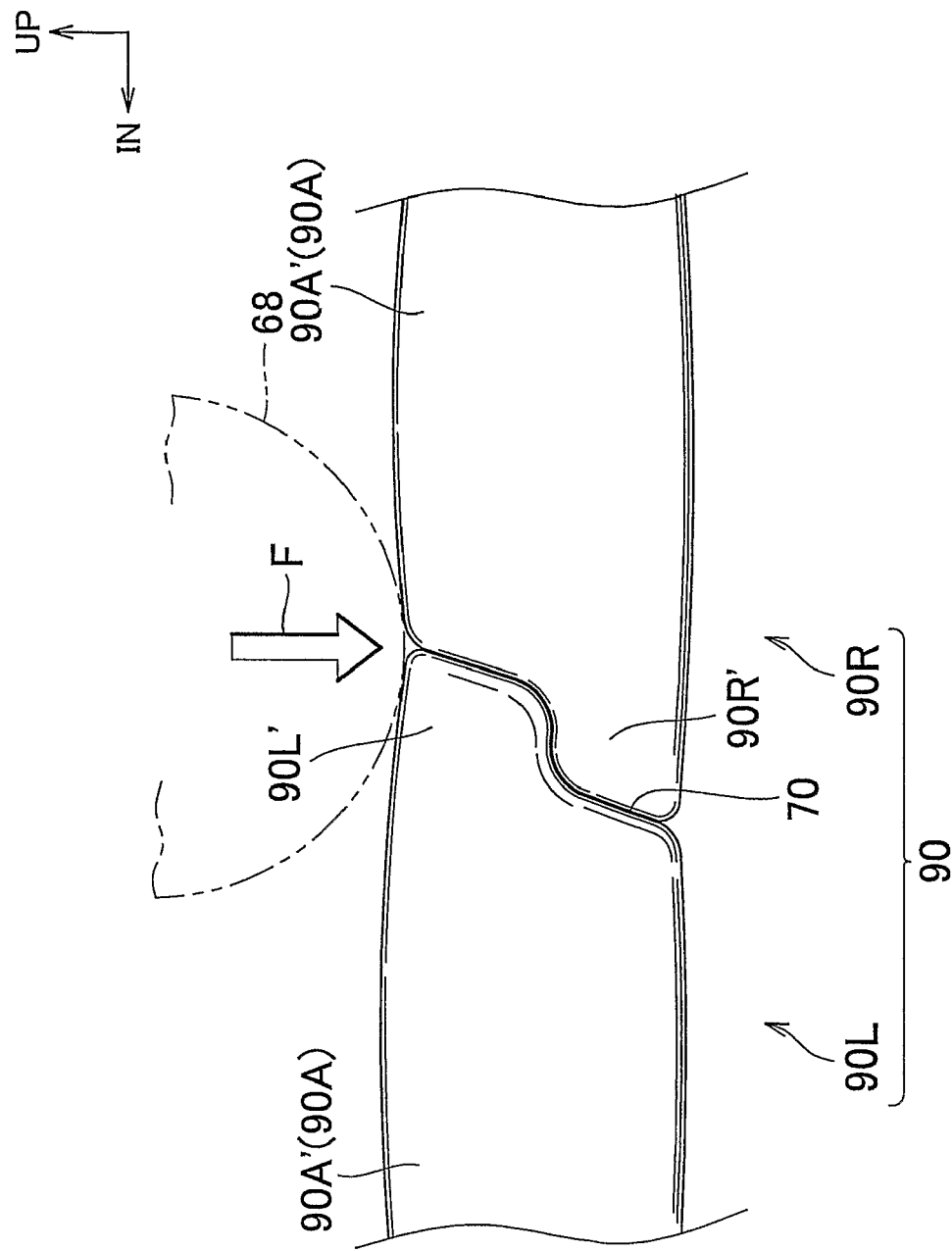
FIG. 8 is a partially enlarged front elevational view corresponding to FIG. 5 but showing left and right airbags in accordance with a first example of a third preferred embodiment of the present invention as viewed from the front side of a motor vehicle, which view depicting the situation that an impact object has collided against the area at which the left and right airbags come into abutment against each other at their hood-center side ends under a condition mutually engaged in a bag thickness direction.

Specifically, in the first example of the third embodiment, illustrated in FIG. 8, the hood-center side end 90L' of the left airbag 90L and the hood-center side end 90R' of the right airbag 90R have a stepped shape such that they are engaged with each other in the up-down direction of the hood as viewed from the front side of the hood. Base fabrics forming the left and right airbags 90 are so cut and sewn as to provide such a stepped shape. Furthermore, in case of this embodiment, the hood-center side ends 90L' and 90R' overlap with each other when viewed from the front side of the hood.

Meanwhile, in the second example of the third embodiment shown in FIG. 9, the hood-center side end 92L' of the left airbag 92L and the hood-center side end 92R' of the right airbag 92R have a stepped shape such that they are engaged with each other in the longitudinal direction of the hood as viewed from above. Base fabrics forming the left and right airbags 92 are so cut and sewn as to provide such a stepped shape. More specifically, the left airbag 92L has a vehicle-front side cell and a vehicle-rear side cell, where the vehicle-front side cell is shorter in the vehicle width direction than the vehicle-rear side cell. The right airbag 92R has a vehicle-front side cell and a vehicle-rear side cell, where the vehicle-front side cell is longer in the vehicle width direction than the vehicle-rear side cell. Moreover, in case of this embodiment, the hood-center side ends 92L' and 92R' overlap with each other when viewed from above.

With the arrangement illustrated in FIG. 8, when the left and right airbags 90 are deployed, the hood-center side ends 90L' and 90R' thereof are engaged or overlapped with each other in the bag thickness direction. Thus, even when the impact object 68 collides with the contact region (juncture) 70 of the left and right airbags 90, the hood-center side ends 90L' and 90R' thereof can receive the impact object 68 in a mutually engaged state. In other words, it is unlikely that the hood-center side ends 90L' and 90R' of the left and right airbags 90 will become disengaged from each other. This assures energy absorption performance in the contact region 70 of the left and right airbags 90.

Meanwhile, with the arrangement illustrated in FIG. 9, when the left and right airbags 92 are deployed, the hood-center side ends 92L' and 92R' thereof are engaged or overlapped with each other in the longitudinal direction of the vehicle. Thus, even when the impact object 68 collides with the contact region (juncture) 70 of the left and right airbags 92, the hood-center side ends 92L' and 92R' thereof can receive the impact object 68 while mutually engaged. In other words, it is unlikely that the hood-center side ends 92L' and 92R' of the left and right airbags 92 will become disengaged from each other.

As described above, in accordance with the third embodiment, an engaging force is attained in the contact region 70, which makes it possible to assure energy absorption performance in the contact region 70 of the left and right airbags 90 and 92. In particular, the stepped contact region 70 in the embodiment illustrated in FIGS. 8 and 9 leads to an increase in the contacting area between the hood-center side ends 90L' and 90R' of the left and right airbags 90 and in the contacting area between the hood-center side ends 92L' and 92R' of the left and right airbags 92. Thus, the frictional force is correspondingly increased and the frictional resistance against disengagement of the hood-center side ends increases, which helps to prevent the hood-center side ends of the airbags from being disengaged at the time of collision of the impact object 68.

Hereinafter, a hood airbag device in accordance with a fourth preferred embodiment of the present invention will be described with reference to FIG. 10. The same parts or components as in the first embodiment described earlier will be designated by like reference numerals, and descriptions thereon will be omitted.

The hood airbag device of the fourth embodiment is characterized in that retainers are provided on the confronting surfaces of the hood-center side end portions, respectively. The retainers are adapted to interconnect the hood-center side end portions of the left and right airbags by generating a retaining force to keep them in contact.

Specifically, in the embodiment shown in FIG. 10, face-to-face fasteners 102 serving as the retainers are respectively attached, by sewing or by means of an adhesive agent, to the confronting surfaces of the hood-center side end 100L' of the left airbag 100L and the hood-center side end 100R' of the right airbag 100R. The face-to-face fasteners 102 are an example of the retainer and any fasteners may be employed so long as they can generate the required retaining force.

With the arrangement illustrated in FIG. 10, when the left and right airbags 100 are deployed, the face-to-face fasteners 102 provided on the confronting surfaces of the hood-center side ends 100L' and 100R' make contact with each other and become mutually bonded. This produces a retaining force in the contact region 70 of the left and right airbags 100, the strength of which depends on the binding force of the face-to-face fasteners 102. As a result, even when the impact object 68 collides with the contact region 70 of the left and right airbags 100, it is unlikely that the face-to-face fasteners 102 will be peeled off to thereby separate the hood-center side ends 100L' and 100R'. This makes sure that the impact object 68 is received by the contact region 70 of the left and right airbags 100.

As described above, in accordance with the fourth embodiment, the face-to-face fasteners 102 create a retaining force in the contact region 70, which assures energy absorption performance in the contact region 70 of the left and right airbags 100.

In FIG. 10, which shows the face-to-face fasteners 102 with a thickness, the contact region 70 looks as if it is in a non-contacted state, but, actually, a bag inflating pressure acts in the contact region 70 and therefore the confronting surfaces makes contact with each other in the contact region 70 with the face-to-face fasteners 102 interposed therebetween.

In the respective embodiments described above, e.g., in the first embodiment, the inflators 58 are divided into left and right ones to match the left and right airbags 60. However, alternatively, a single inflator 58 may be provided at the center of the airbag case 46, in which case the gas is supplied to the left and right airbags 60 through gas supply lines such as hoses or the like.

Furthermore, in the foregoing embodiments, e.g. in the first embodiment, the airbags 60 are configured, when deployed, to cover the lower end portion of the windshield 64 and the lower areas of the front pillars 66, as well as the rear end portion 14A of the hood 14 and the cowl 62. Alternatively, the airbags 60 may be configured to cover at least the rear end portion 14A of the hood 14 (the rear end portion 16A of the outer hood panel 16) and the cowl 62, which falls within the scope of the present invention.

Moreover, in the foregoing embodiments, e.g. in the first embodiment, the left and right bag-expansion openings 18 are formed at the rear end portion of the outer hood panel 16, and the left and right airbag doors 48 are provided in a corresponding relationship with the bag-expansion openings 18. Alternatively, a single elongated airbag door 110 may be used to close the left and right bag-expansion openings 18.

Specifically, as shown in FIGS. 11 and 12, an elongated recess 112 extending in the vehicle width direction is formed at the rear end portion of the outer hood panel 16. The recess 112 has a depth substantially equal to the thickness of the airbag door 110. The left and right bag-expansion openings 18 are formed in the longitudinal opposite end regions of the recess 112 by punching. This leaves a center region 114 between the left and right bag-expansion openings 18 that serves as a juncture portion and is coplanar with the bottom surface of the recess 112. The bag-expansion openings 18 have the same cross-section as the ones illustrated in FIG. 3 and set forth earlier.

Furthermore, each of the left and right bag-expansion openings 18 is smaller than the recess 112, so that attachment seats 11,6 for the airbag door 110 are formed on the peripheral edge portions around the bag-expansion openings 18. In this regard, while the attachment seats 116 are formed at the front and rear outer corner portions 118 located on the outer sides of the bag-expansion openings 18, no attachment seat is formed at four inner corner portions 120 located on the center side of the outer hood panel 16.

Next, the operation and advantageous effect of the hood airbag device of the alternative embodiment will be described.

Advantageous operation and effect are attained both in the case where the left and right airbag doors 48 are provided and in the case where the single elongated airbag door 110 extending in the vehicle width direction is provided.

When the left and right airbag doors 48 are provided in a pair as in the foregoing embodiments, there is an advantage in that the extensible hinge portions 48B (see FIG. 3) of the respective airbag doors 48 can be formed with ease. Specifically, in the case where the peripheral edges (particularly, the rear edges on the side of the extensible hinge portions 48B) of the airbag doors 48 are curved in conformity with, e.g. the curved shape of the lower edge of the windshield 64, it is necessary to add configurations to the extensible hinge portions 48B, about which the airbag doors 48 rotate, so that the airbag doors 48 opens quickly and smoothly. Examples of such configurations include the deformation amount of the hinge center portion 48B2 (see FIG. 3) and the number of the hinge center portion 48B2. In this case, if the length of the airbag doors 48 in the vehicle width direction is reduced, the positional deviation of the airbag doors 48 caused by the curved axes of opening movement is also reduced. This makes the design for adding the configurations easy. Thus, employment of the left and right airbag doors 48 is advantageous in that it is easy to make a design that allows the airbag doors 48 open quickly and smoothly.

In the meantime, if the single airbag door 110 extending long in the vehicle width direction is provided as illustrated in FIG. 11, there is an advantage in that the design integrity of the outer hood panel 16 is improved.

In the event that the left and right bag-expansion openings 18 are directly formed at the rear end portion of the outer hood panel 16 without providing the recess 112, the corner portions of the bag-expansion openings 18 are located together at the rear center of the outer hood panel 16. Inasmuch as the door attachment seats are formed at the corner portions, strain deformation is likely to occur at the corner portions. For this reason, if the corner portions of the bag-expansion openings 18 are located together at the rear center of the outer hood panel 16, the influence of strain on the outer hood panel 16 becomes greater, thus making it difficult to shape a smooth ornamental surface.

However, in the alternative embodiment shown in FIG. 11, the elongated recess 112 extending in the vehicle width direction is first formed at the rear end portion of the outer hood panel 16 and then the left and right bag-expansion openings 18 are formed in the opposite end regions of the recess 112 so as to leave the door attachment seats 116. Thus, even though the inner corner portions 120 are gathered on the rear center 114 of the outer hood panel 16, no door attachment seat is formed at the inner corner portions 120, so that the strain deformation is difficult to occur. Further, even when a certain level of strain deformation occurs at the corner portions 120 gathered on the rear center 114 of the outer hood panel 16, the strain deformation cannot be seen from outside the outer hood panel 16 because the recess 112 is covered by the airbag door 110 in its entirety. This improves the design integrity of the outer hood panel 16.

While the invention has been shown and described with respect to the preferred embodiments, it will be understood by those skilled in the art that various changes and modification may be made without departing from the scope of the invention as defined in the following claims.

The invention claimed is:

1. A hood airbag device for use in a vehicle, comprising:
a gas generating unit that discharges a gas when the vehicle makes a head-on collision with an impact object, the gas generating unit being arranged below a rear end portion of an outer hood panel that serves as an outer plate of a hood; and
a left and right airbag, each of which is stored in a folded state below a respective left and right bag-expansion opening formed at the rear end portion of the outer hood panel, in a hood width direction, wherein each airbag is deployed through the respective bag-expansion opening by the gas supplied from the gas generating unit to cover at least the rear end portion of the outer hood panel and a cowl, and each airbag is sized in a vehicle width direction such that, when the airbags are in a deployed state, hood-center side end surfaces of the airbags in the vehicle width direction directly press against each other, and hood-center side end portions of the airbags in the vehicle width direction are bulged to have a thickness greater than that of other portions of the airbags.

2. The hood airbag device according to claim 1, wherein each airbag includes a main body portion that covers the rear end portion of the outer hood panel and the cowl, and a bag extension portion, communicating with the main body portion, that covers at least a lower area of a front pillar.

3. The hood airbag device according to claim 2, wherein the main body portion is formed by a plurality of cells including front and rear cells, and end portions of the cells, which are located at an outer side in the vehicular width direction, are in communication with the bag extension portion.

4. The hood airbag device according to claim 3, wherein the gas generation unit is an inflator having a gas emission hole, and the inflator is disposed in the front cell so that the gas emission hole is located at the outer side in the vehicular width direction.

5. The hood airbag device according to claim 1, wherein the gas generating unit is provided for each of the left and right airbags, each gas generating unit is arranged along a longitudinal direction of each of the bag-expansion openings and has a gas emission hole disposed near an outer end of the corresponding bag-expansion opening.

6. The hood airbag device according to claim 1, wherein the airbag comprises a plurality of tubular cells each extending in the vehicle width direction, the tubular cells being arranged side by side in a longitudinal direction of a vehicle.

7. The hood airbag device according to claim 1, wherein the hood-center side end portions in the vehicle width direction have a swelling and protruding shape bulged in an upward direction of the hood.

8. The hood airbag device according to claim 1, wherein the hood-center side end portions in the vehicle width direction are greater in diameter than tubular cells forming the remaining general regions of the airbag.

9. The hood airbag device according to claim 1, wherein the left and right bag-expansion openings are openably closed by a pair of left and right covers, respectively.

10. The hood airbag device according to claim 1, wherein an elongated recess extending in the vehicle width direction is formed at the rear end portion of the outer hood panel, and the left and right bag-expansion openings are formed in such a manner as to leave a cover attachment seat, the respective bag-expansion openings being openably closed by a single cover.

11. A hood airbag device for use in a vehicle, comprising:
at least one inflator that discharges a gas when the vehicle makes a head-on collision with an impact object, the at least one inflator being arranged below a rear end portion of an outer hood panel that serves as an outer plate of a hood; and
a left and right airbag, each of which is stored in a folded state below a respective left and right bag-expansion opening formed at the rear end portion of the outer hood panel, in a hood width direction, wherein each airbag is deployed through the respective bag-expansion opening by the gas supplied from the at least one inflator to cover at least the rear end portion of the outer hood panel and a cowl, and, when the airbags are in a deployed state, the hood-center side end portions of the airbags in a bag width direction press against each other, wherein:
each airbag comprises a plurality of tubular cells;
each of the tubular cells extends in a vehicle width direction; and
when the airbags are in a deployed state, the tubular cells of each airbag are arranged side by side in a vehicle longitudinal direction, and an inflator of the at least one inflator is disposed in a frontmost cell of the plurality of tubular cells of each airbag in the vehicle longitudinal direction.

12. The hood airbag device according to claim 11, wherein the left and right airbags have confronting surfaces on which retainers are provided, respectively, and the retainers interconnect the hood-center side end portions of the airbags in the bag width direction by generating a retaining force to keep them in contact.

13. The hood airbag device according to claim 12, wherein the retainer is a face-to-face fastener attached to the confronting surface of the hood-center side end portion.

* * * * *